(12) United States Patent
Levera et al.

(10) Patent No.: US 6,312,244 B1
(45) Date of Patent: Nov. 6, 2001

(54) PLANT FOR MANUFACTURE OF FOAM PRODUCTS

(75) Inventors: Guido Levera, Cantu (IT); Francis Herlin, Amiens (FR)

(73) Assignee: Sapsa Bedding SpA, Assago (MI) (IT)

( * ) Notice: Subject to any disclaimer, the term of this patent is extended or adjusted under 35 U.S.C. 154(b) by 0 days.

(21) Appl. No.: 09/521,621

(22) Filed: Mar. 8, 2000

Related U.S. Application Data

(62) Division of application No. 09/061,148, filed on Apr. 16, 1998, now Pat. No. 6,086,802.

(51) Int. Cl.[7] .................................................. B29G 44/46
(52) U.S. Cl. ......................... 425/4 C; 425/185; 425/220; 425/223; 425/817 C
(58) Field of Search ............................. 425/46, 185, 220, 425/453, 817 C, 223, 224

(56) References Cited

U.S. PATENT DOCUMENTS

| | | | |
|---|---|---|---|
| 2,586,275 | 2/1952 | Toulmin, Jr. ........................ | 264/45.8 |
| 2,757,415 | 8/1956 | Mathues et al. ..................... | 264/213 |
| 2,835,924 | 5/1958 | Schmeling .......................... | 264/45.8 |
| 3,630,502 | 12/1971 | Schmict ............................. | 198/795 |
| 3,736,081 | 5/1973 | Yovanovich ........................ | 425/4 C |
| 3,838,957 | * 10/1974 | Koide et al. ....................... | 425/174.6 |
| 4,035,126 | 7/1977 | Manning ............................ | 425/157 |
| 4,174,415 | 11/1979 | Bethe ............................... | 264/45.8 |
| 4,325,685 | * 4/1982 | Lupke et al. ....................... | 425/183 |
| 4,357,373 | 11/1982 | Cooper ............................. | 264/45.8 |
| 4,504,206 | * 3/1985 | Lupke et al. ...................... | 425/326.1 |
| 4,737,091 | 4/1988 | Fiorentini .......................... | 425/88 |
| 5,217,727 | * 6/1993 | Kameyama et al. ................. | 425/185 |
| 5,229,138 | * 7/1993 | Carotti ............................. | 425/4 C |
| 5,264,167 | 11/1993 | Proksa et al. ...................... | 264/46.2 |
| 5,453,231 | 9/1995 | Douglas ............................ | 264/45.8 |
| 5,531,585 | * 7/1996 | Lupke .............................. | 425/233 |

FOREIGN PATENT DOCUMENTS

| | | |
|---|---|---|
| 380963 | 9/1994 | (EP) . |
| 0621120 | 10/1994 | (EP) . |

OTHER PUBLICATIONS

European Official Communication of Oct. 12, 2000 for EP 98106865.3.

* cited by examiner

*Primary Examiner*—Nam Nguyen
*Assistant Examiner*—Joseph S DelSole
(74) *Attorney, Agent, or Firm*—Stevens, Davis, Miller & Mosher, LLP

(57) ABSTRACT

A plant is provided for manufacture of latex foam products comprising recesses, such as mattresses, cushions and the like. The plant makes use of a plurality of carriers placed in a ring-like configuration limited by a first, upper stretch between a foam injecting station and a product-removing station and by a second lower stretch for the return of the carriers devoid of foam, to the injecting station. At any moment the first stretch is filled with carriers, touching each other and making a single mold on which foam is injected, while on the second stretch, at least one carrier, or a discrete number of carriers, considerably separated form one another, travel. The carriers of the first and second stretch are moved by different and independent operating systems and the speed of the carriers in the second stretch is considerably higher than the speed of the carriers in the first stretch, so that, a carrier can always be present at the injecting station, while another carrier leaves the removing station.

18 Claims, 4 Drawing Sheets

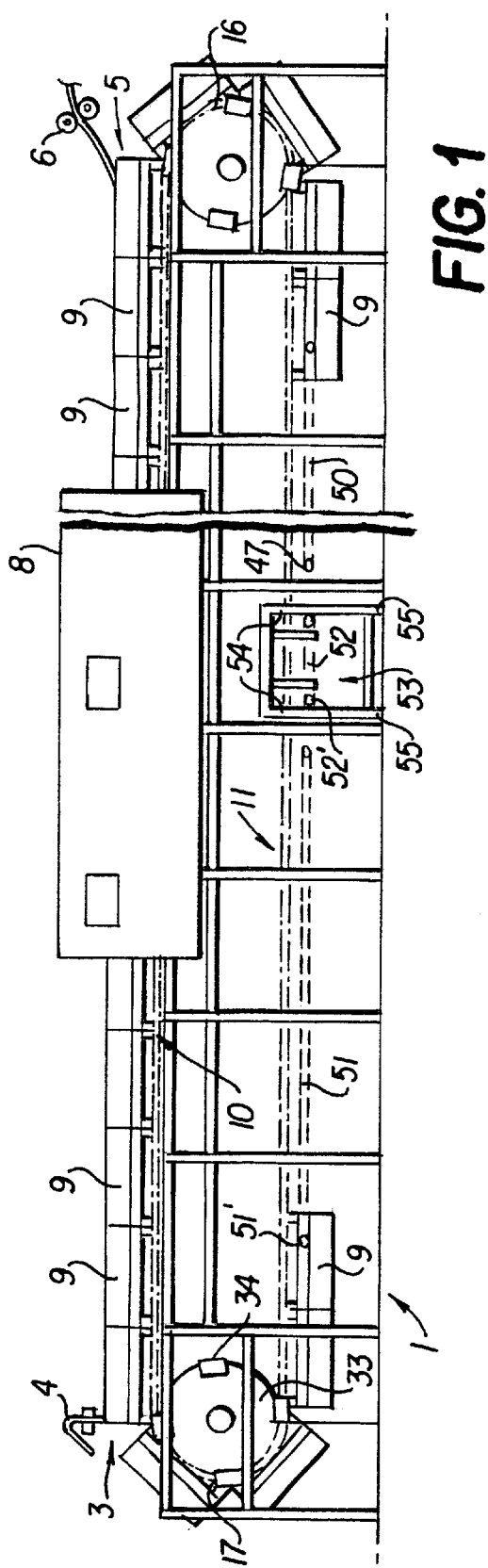
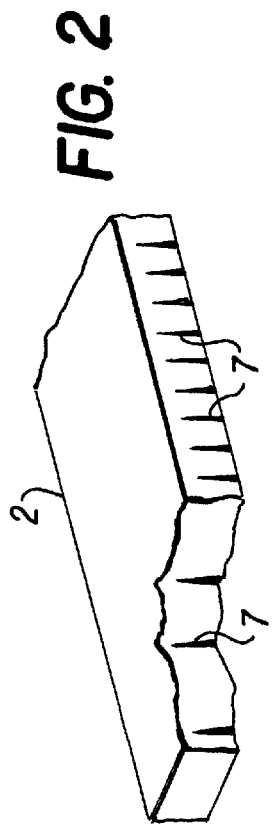
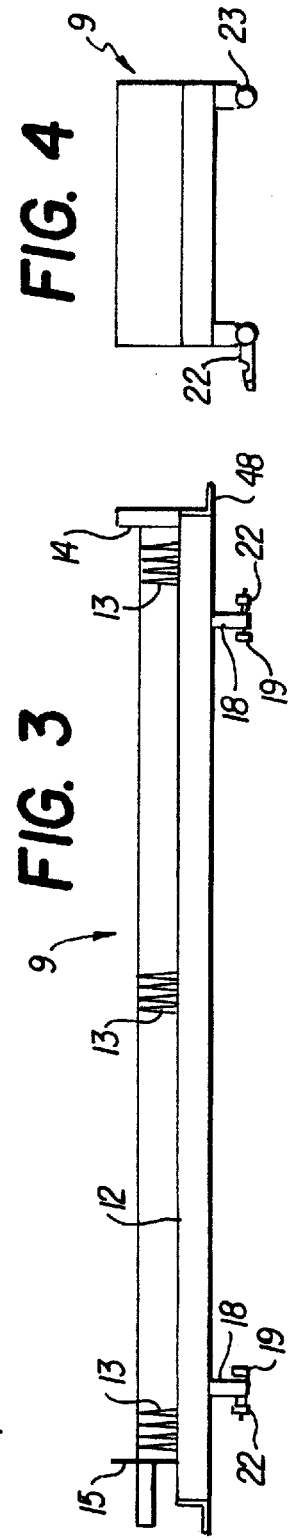

PLANT FOR MANUFACTURE OF FOAM PRODUCTS

This claims priority under 35 USC §120 as divisional of Ser. No. 09/061,148 filed Apr. 16, 1998 now U.S. Pat. No. 6,086,802, incorporated herein by reference.

FIELD OF THE INVENTION

The present invention refers to a process for continuous manufacture of latex foam products of unlimited length and, more particularly and preferentially, to continuous manufacture of products comprising recesses such as, for instance, mattresses, cushions and the like.

BACKGROUND OF THE INVENTION

A known process for manufacture of the mentioned products involves a plurality of molds with a laying surface for latex foam material and a plurality of protuberances useful to the formation of recesses.

Each mold includes a cover through which foam emulsified with air and devoid of swelling media is injected until complete filling in of the mold.

Each mold is placed on a carrier and all the carriers separated from each other are moved through a tunnel vulcanizer which is steam heated.

At the end of the manufacturing process each single mold is open and the product with recesses is removed.

The said process enables to manufacture single products comprising recesses of limited length and width, ready for the required use.

Further processes are known, different from the above mentioned ones, for enabling the continuous manufacture of products of unlimited length comprising recesses, then cut to single sized articles.

One of these processes, described in U.S. Pat. No. 2,757,415, is based on continuous moving of a metal sheet provided with a plurality of perforations aimed to receive the protuberances located on the surface of a flexible belt. The metal sheet is ring-wound around two pulleys.

The belt is inside with respect to the metal sheet and ring-wound around two wheels having shorter diameter than the pulleys around which the sheet is wound.

The sheet and the belt are simultaneously moved in line towards the vulcanizer, in such a way that the protuberances of the belt pass through the perforations of the sheet penetrating through the latex foam material injected on the surface of the sheet at a suitable station.

The pulley on which the metal sheet moves downstream of the vulcanizer, being of greater diameter than the corresponding wheel of the belt, makes the removal of the product with recesses easier.

U.S. Pat. No. 5,229,138 describes in turn a continuous process for manufacture of products with recesses including a plurality of plates placed side by side to each other, the plates are joined at their sides to the links of two chains ring-wound around two gear wheels, respectively driving and driven.

Such plates are envisaged to form laying surfaces of the latex foam material injected on them at a first station, each plate includes a plurality of protuberances aimed at forming the recesses of the product.

A tunnel vulcanizer is placed between the injecting station and a removing station of the product with recesses; the removal of the product is carried out by means of two rolls rotating in opposite directions to each other, between which the product with recesses is dragged.

The plates form a ring shaped surface uninterrupted through its whole extension both in the upper and in the lower branch of the plant, as well as in the ring shaped stretches connecting the two branches around the two gear wheels.

The foam filled plates are moved forward through the vulcanizer and, after the removing of the product with recesses, come back, always with uninterrupted movement and side by side to each other, to the injecting station.

Such being the mentioned state of art, the applicant has posed the problem of obtaining a continuous manufacture of latex foam products comprising recesses with a considerable reduction of times spent both for maintenance operations and for the possible changes of parts of the apparatus which may be required to modify the features of the products to be manufactured, as well as a cutback of manufacturing costs, in no case jeopardizing the quality of products, but rather improving them.

It was thought then that the solution of the problem could come from employing a lower number of means than in the known technique. It has been perceived, in fact, that the known manufacturing techniques of products comprising recesses make use of a higher number of means than needed even if latex foam material has to cover only the stretch interposed between the injecting and the removing station, either a continuous foam laying surface made by a thin, ring-wound sheet, as described in U.S. Pat. No. 2,757,415, or a plurality of plates, placed side by side with no interruptions in a ring-like configuration, are generally used. As a matter of act, in both cases, the actual extension of the laying surface of foam material is active just in a limited part of its extension.

More particularly, it was thought that the problem could be solved excluding the known technique described in U.S. Pat. No. 2,757,415, since a continuous laying surface of foam material such as the one of a belt or a like, rolled up around two pulleys, could not be reduced. It has been moreover thought that the known solution required in any case a simultaneous perfect alignment between belt perforations and metal sheet protuberances very difficult to be maintained or a long time.

It was thought then that a solution could be found more generally starting from the hypothesis of adopting a number of laying surfaces continuous at any moment in a first stretch between the foam laying station and the removing station of the product with recesses, and discontinuous in the return stretch of the laying surfaces devoid of foam material towards the injecting station.

However not even this perception could solve the problem.

SUMMARY OF THE INVENTION

It was then thought that a solution could be reached by moving the laying surfaces of the first stretch independently of the laying surfaces of the return stretch, in such a way as to change the moving speed of the two stretches.

It was therefore thought possible to cover completely the first stretch with laying surfaces at any moment of the process, in such a way as to form a single mold, and to cover partially the return stretch, provided that the laying surfaces of the return stretch are moved at a higher speed than the ones of the firs stretch, in such a way as to maintain a continuous molding surface at any moment between the injecting and the removing stations.

A first basic feature of the invention is therefore a continuous process for manufacture of latex foam products of unlimited length envisaged to form mattresses, cushions and the like, comprising the following steps:

moving forward continuously, at a first speed, a plurality of laying planes between a first and a second station, between which a third vulcanizing station is interposed, said laying planes being of determined sizes, injecting latex foam at the first station until forming a layer of determined thickness of said product, on said laying planes, vulcanizing, removing at the second station the vulcanized product;

characterized by the fact of:
a) moving forward, at the same time when the laying planes are transferred from the first to the second station, at a second speed, higher than the first, at least one of the laying planes devoid if foam material coming from the exit of the second station up to the proximity of the first station,
b) pushing by means of said, foam devoid, laying planes, the plurality of laying planes placed between the first and the second station, said second speed and said push given by said laying planes devoid of foam material always determining between the first and the second station a constant plurality of laving planes touching each other and forming a continuous surface for making such said products of unlimited length.

In particular, the process is suitable for manufacturing products with recesses.

In agreement with a preferential actuation form, the process envisages the possibility of continuously injecting the latex foam material and maintaining unchanged the first speed of the laying planes between the first and the second station; carrying out simultaneously the further steps of:
c) removing close to a fourth station each of the laying planes devoid of foam material, coming out from the second station,
d) changing said predefined sizes of the laying planes;
e) moving forward at said second speed laying planes with new, predetermined sizes, up to the proximity of the first station and repeating the phase b).

Preferentially the ratio between the second and the first linear speed is between 10 and 50; and, more preferentially, between 25 and 35.

A second feature of the invention is represented by a plant for manufacture of latex foam products of unlimited length, envisaged to form mattresses, cushions and the like.

The plant includes an injecting device for latex foam material placed in a first station, means for the laying of the latex foam material each provided with a laying plane of predetermined size, a vulcanizer, operating means for the laying means, removing means of the vulcanized article placed in a second station, a first stretch along which the laying planes are moved from the first to the second station, a second stretch to take back the laying planes coming from the second station towards the first station.

The plant includes some basic features and in particular:
a) the first stretch is occupied at any moment and for its whole extension, by a plurality of side by side laying planes forming a continuous surface,
b) the second stretch is occupied at any moment only partially by laying planes through its whole extension,
c) said laying planes of the first and of the second stretch are moved respectively at a first and a second speed, said second speed being higher than the first one.
d) the ratio between the second and the first speed determines the presence of a laying plane at the first station when a laying plane goes out from the second station.

In a first embodiment the operating means include a first and a second operating system being different and independent of each other.

More particularly, the first operating system gives a mechanical push for moving along the first stretch the plurality of laying planes, touching each other, from the first to the second station; the second operating system moves along the second stretch the laying planes devoid of foam material towards the fist station.

According to this solution the plurality of laying planes moved along the first stretch covers completely the distance between the first and the second station, whereas the number of laying planes moved in the second stretch is lower than those of said plurality of planes and, practically, the substantial lack of covering of the second stretch occurs.

Advantageously, the feature of the first and second operating system different and independent of each other enables plant comprising means for replacing and changing the laying planes moved along the second stretch with no interruption of the manufacturing cycle between the first and the second station.

According to a further embodiment the second stretch of the plant is subdivided into two sections, first and second, spaced apart from one another by an area of predetermined size substantially corresponding to the size of a laying plane; the sections are moreover provided respectively with a first and a second transferring means for the laying planes devoid of foam material.

The interposed area is provided with transverse shifting means aimed at moving in a direction transverse to the second stretch the laying planes devoid of foam to be changed in size or to be subjected to maintenance operations. The same shift line means may be used to convey again the modified laying planes to the second stretch, the whole step being performed without stopping the manufacturing cycle occurring between the first and second station.

Preferentially the transferring means of the second stretch are made by two side chains or equivalent driving elements engaging suitable driving and driven wheels in such a system the laying planes stand, with their weight, on the chains and are advanced by the movement of the chains.

BRIEF DESCRIPTION OF THE DRAWINGS

The present invention will be better understood by means of the following description and of the enclosed figures made by way of non limiting example with reference to the attached sheets of drawings in which:

FIG. 1 is a longitudinal view of the plant.

FIG.2 is a partial, perspective view of a product having recesses which can be obtained by means of the plant of FIG. 1.

FIG. 3 is a schematic, cross view of a carrier of the plant in FIG. 1.

FIG. 4 is a longitudinal view of a carrier of the plant in FIG. 1.

DETAILED DESCRIPTION OF THE PREFERRED EMBODIMENTS

Figure 5:
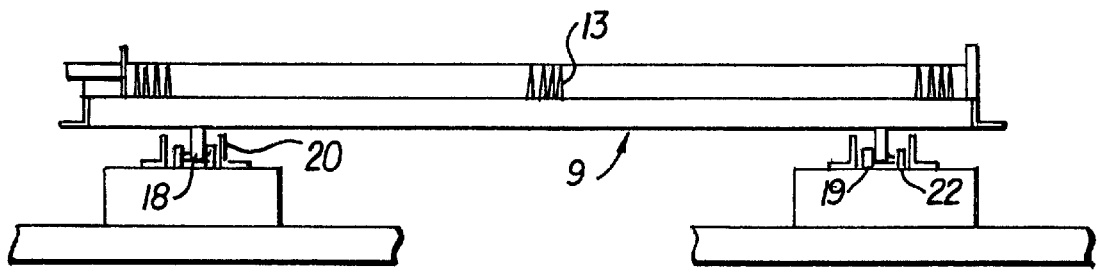
FIG. 5 is a partial cross view of a carrier joined to parts of the upper stretch of the fixed structure of FIG. 1.

In FIG. 1 a plant 1 is shown for continuous manufacture of a latex foam mattress 2 of unlimited length produced between a first station 3 provided with a foam injecting device 4 and a second removing station 5. Mattresses removing means are placed close to the removing station 5. Such removing means are schematically represented by two rolls 6 which rotate in opposite directions to each other for carrying the mattress pass in between them.

In FIG. 2 a portion of a mattress 2 is shown, made by a core of natural and/or synthetic latex foam material, crossed over at least one of its two sides by a plurality of recesses 7 placed according to a predetermined and wished geometry.

Recesses are schematically represented as tapered and ended in a point; however both their size and their shape and height can be slightly different: for instance they can be cylinder-shaped with a circular connection on their top, or cylinder-shaped at their base and tapered toward their top, or, anyway, of any shape already known.

Between the injecting and the removing station a vulcanizing station is set, including a device 8 for latex foam vulcanization and, for instance, among other things, a tunnel-type vulcanizer with high pressure steam as heating fluid.

The plant 1 comprises laying means for latex foam material made by a plurality of laying planes of established size, operating means of the laying planes, a first stretch wherein the laying planes are moved from the first to the second station, a second stretch where the laying planes coming from the second station are moved up to the first station.

In the preferential embodiment, the laying means are carriers 9 running along a first and a second stretch, respectively 10, 11, both stretches being part of a ring-shaped configuration in a vertical plane, however different solutions where, for instance, the first and second stretches are part of a ring-like configuration arranged on a horizontal surface may be alternative embodiments of the invention. The stretches 10, 11 have their opposed ends vertically aligned to each other at the stations 3 and 5.

Each of the carriers 9 comprises (FIGS. 3,4) a laying plane 12 whereon a plurality of protuberances 13 outwardly projecting are disposed according to geometry and shape corresponding to the ones of recesses 7 of the mattress 2.

The width of the laying plane of each carrier is defined by two vertical walls 14, 15, the latter being movable among the rows of protuberances for varying the width size of the final product.

A basic feature of the plant is that the first stretch 10 of the plant is always occupied at any moment through its whole extension by the same number of carriers strictly in contact with each other, unlike the second part 11 which is only partly occupied by carriers considerably spaced apart from each other; said carriers of the second part are those coming in ordered succession from the first part.

As a matter of fact, according to the invention, the carriers of the first stretch are moved at a first linear speed between the first and the second station and the carriers of the second stretch at a second linear speed higher than the first one.

More clearly, according to the invention the ratio between the speed of the second and the first stretch is higher than 1 and particularly the invention foresees that, whatever the value of such a ratio, the speed of the carriers of the second stretch 11 can determine a carrier being present at the first station in correspondence with the exit by means of the rolls 6 of a foam filled carrier at the second station.

To this purpose the plant 1 comprises operating means made by a first and a second operating systems being different and independent of one another.

In a general embodiment the first operating system is suitable for transmitting P mechanical push moving the carriers 9 along the first stretch between the station 3 and the is station 5. According to this embodiment it is provided that each carrier still to be filled with foam materials reaches the station 3 with a mechanical push which is then transferred to the foam-filled carrier immediately adjacent to it.

The second operating system refers to the transfer of carriers by the movement of supporting surfaces.

The motion of the carriers is carried out along a fixed structure delimited in a ring-Like way by the first and second stretch 10,11, joined to one another at their ends by means of a third and a fourth stretch shaped as an arc of a circle 16, 17 respectively arranged between the exit of the first stretch and the entry of the second stretch and between the exit of the second stretch and the entry or the first stretch. According to this solution driving means are planned for carriers 9 made by a set of wheels at each corner of their parallelepiped-like base.

The set of wheels includes (FIG. 3) a supporting block 18 on which at least an idle wheel 19 is mounted. The two side wheels of the carrier are axially inside with reference to the supporting blocks 18.

In an alternative solution it is possible to provide a pair of wheels straddling, each supporting block. Such a solution could be chosen to guarantee, if necessary, the greatest possible stability of the carrier.

Figure 6:
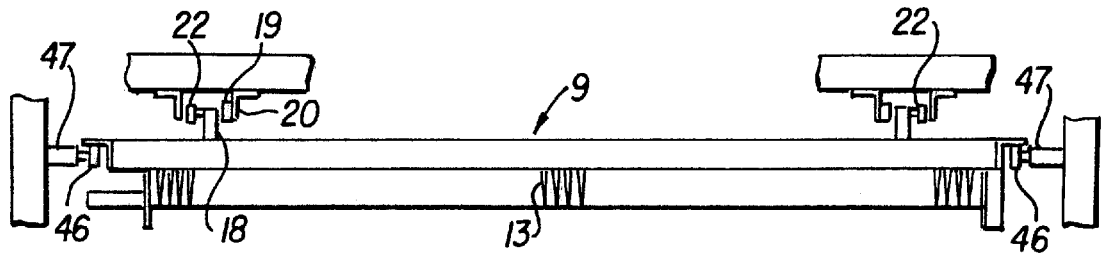
FIG. 6 is a partial cross view of a carrier connected to parts of the lower stretch of the fixed structure shown in FIG. 1.

The driving means of carriers 9 comprises some tracks (FIGS. 5,6) arranged on rigid portions 20 of the fixed structure. More particularly, the tracks (FIGS.7,8) are special C-shaped outlines 21 connected to the rigid portions 20; the carriers during their movement are driven by rolling of the wheels 19 within the C-shaped outlines.

The motion of the carriers is performed so that they are joined to each other mainly when it is necessary to ensure the formation of a continuous bed on which it is possible to deposit latex foam material, and separated from one another when it is necessary to connect them singly to the second operation system able to give the higher linear speed that is required to have a continuous laying surface in the first stretch of the plant.

To this purpose means provided for connecting temporarily the carriers are realized, in the example of description, arranging lever means 22 to a first end of each carrier, and means 23 for lever means 22 placed on an adjacent carrier (FIGS. 3–4).

Preferentially said lever means 22 comprise (FIG. 9) at least a lever 24 with a first end hinged in a point 25 to an end of the carrier and with a second free end 26 interfering with cam means of the fixed structure.

Figure 7:
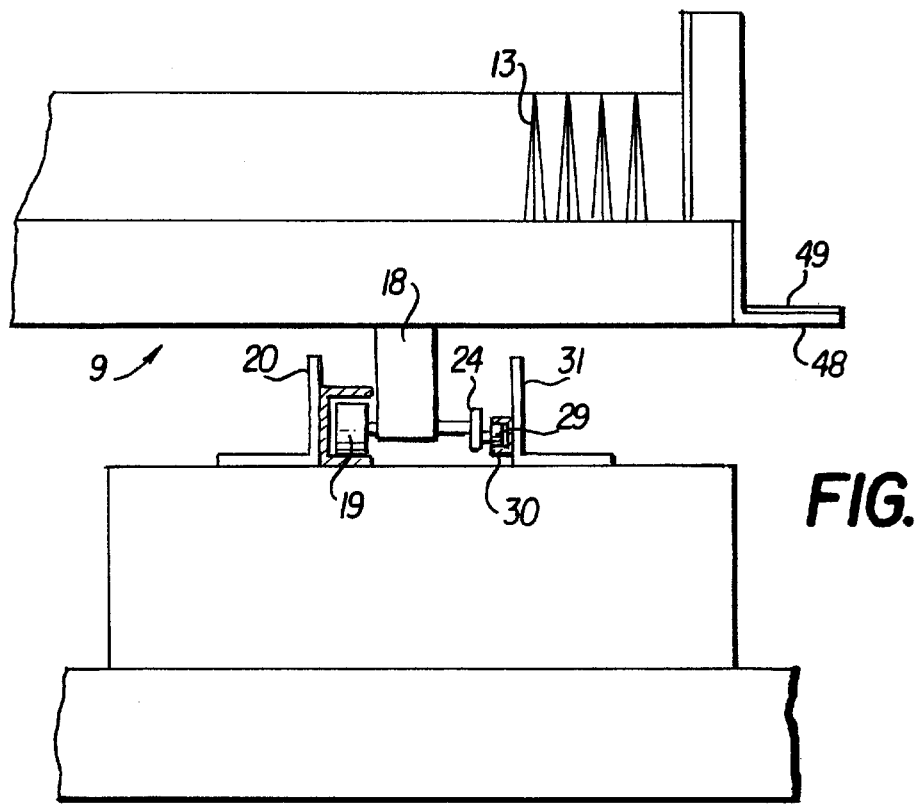
FIG.7 is a partial enlargement of the view in FIG. 5.
Figure 8:
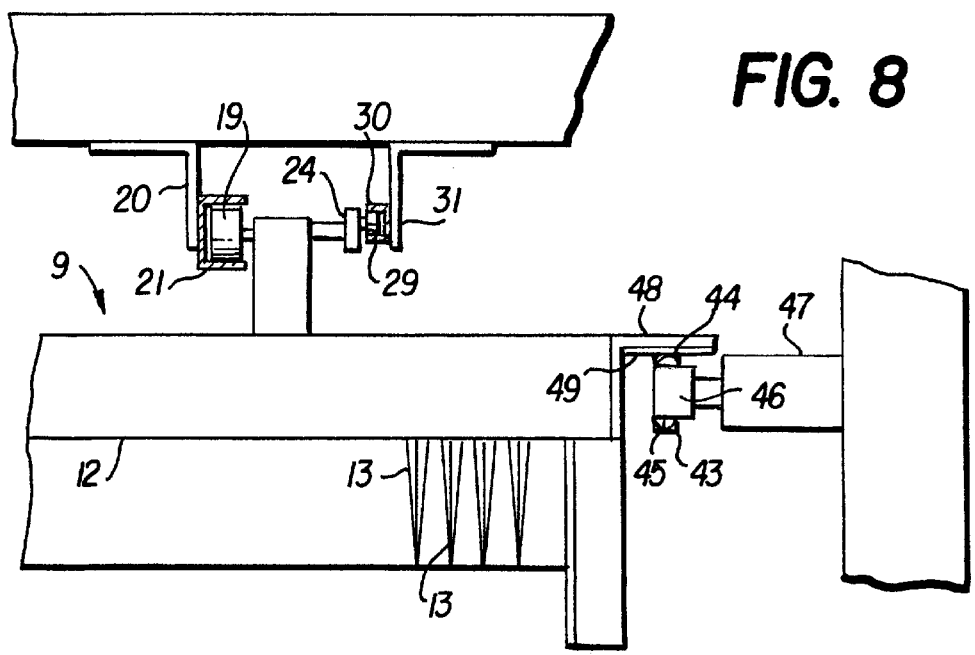
FIG. 8 is a partial enlargement of the view in FIG. 6.

More particularly in the preferential example of description, the lever 24 FIGS. 7,8) is hinged on the same axis of the carrier wheel, but at the opposite part referring to the supporting block 1.

The lever 24 has a groove 27 (FIG. 9) between its two ends provided for grasping the blocking means of an adjacent carrier, moreover the lever 24 comprises a driving pulley 28 near the free end 26.

Pulley 28 is provided for interfering with the cam means of the fixed structure.

Preferentially the engaging means 23 of each carrier comprises a cylindrical element or a small shaft that can be introduced or disconnected from the groove 27 of the lever 24 to determine respectively conditions of temporary block or of separation between two adjacent carriers.

Figure 9:
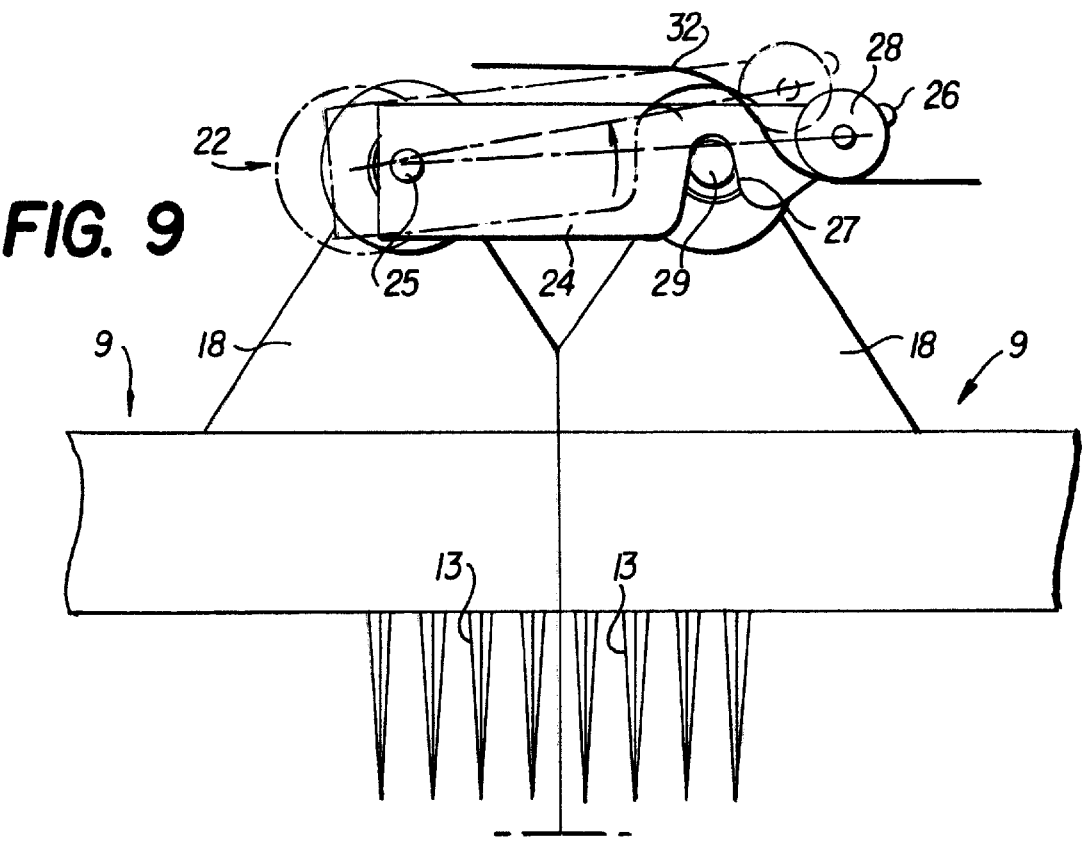
FIG. 9 shows with a continuous Line a partial view of the connecting mechanisms between two adjacent carriers, and, with a dashed line, the preparation to the release.

In the example of FIG. 9 the cylindrical element is represented as pin 29.

As already mentioned, a further possible solution comprises a pair of wheels straddling on each supporting block 18 and the pin 19 longitudinally in line with the axially outermost wheel.

The preferential embodiment of the plant refers to the utilization of a single wheel axially internal with respect to the supporting block 18, as it can be seen in the cross views, however, to simplify the drawings, in the longitudinal views of the carriers, even the parts of the wheels which should be hidden by the supporting block 18 are drawn with a continuous, instead of dashed, line.

The lever means 22, similarly to that provided for the carrier wheels, comprises driving means for the pulley 28, preferentially it is planned to drive the pulleys 28 within the C-shaped outlines 30, connected to L-shaped rigid portions of the fixed structure (FIGS. 7,8).

The cam means on which the pulleys 28 of the lever 24 interfere, are represented by sections placed in correspondence of two different levels of the fixed structure connected to each other by an intermediate stretch. Curvilinear links provided for this purpose, connect said intermediate stretch with the two different levels.

More particularly, said cam means comprises slopes 32 (FIG. 9) placed along the fixed structure. Slopes are mainly two, one of them being at some distance from the exit of the third connecting stretch 16, and the second one close to and far from the fourth connecting stretch 17.

The first slope represented in FIG. 9 is planned to release the adjacent carriers.

The second slope (not shown) is opposite compared to the one of FIG. 9 and is provided for connecting adjacent carriers before they are pushed by the first operating system towards the first station.

In the preferred embodiment the first operating system comprises a driving pulley 33 (FIGS. 1,10) and grasping means 34 placed on the pulley for dragging to rotation the carriers along the arc of a circle forming the fourth stretch of the fixed structure and put them into the first station with the said mechanical push.

The pulley 33 is moved by an engine 35 by means of a transmission belt 36.

The grasping devices 34 placed on the pulley are made by a plurality of plates 37 provided with a pair of cavities 38, 39 provided for surrounding the shafts of the wheels of two adjacent carriers.

The plates 37 are connected to the contour of the pulley in angular positions equally staggered among them, in the example there are four plates spaced apart 90° from one another.

Figure 10:
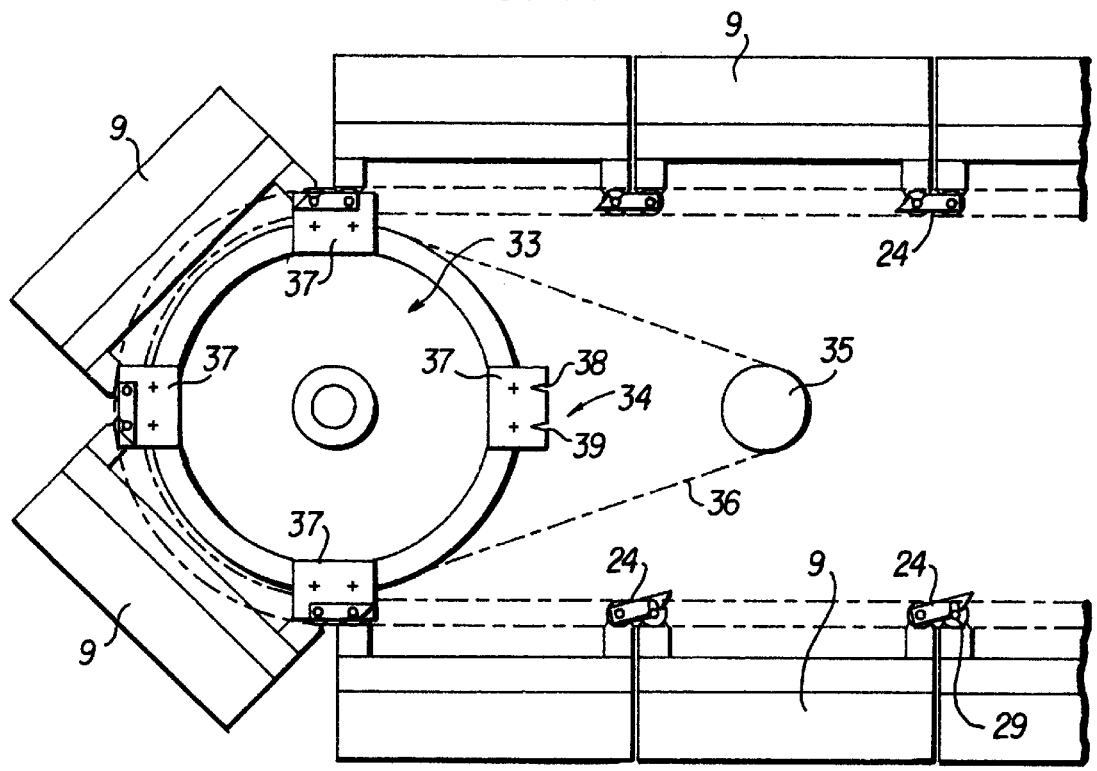
FIG. 10 is an enlargement of a partial longitudinal view of FIG, 1, close to a first driving pulley.

FIG. 10 the cavities 38, 39 of the plates 37 are shown as surrounding the shafts of the wheels of adjacent carriers in an axially interior position with respect to the lever 24 of a carrier and to the pin 29 blocking the same lever on an adjacent carrier, this does not exclude that the cavities 38, 39 can grasp the adjacent carriers in a different way. Besides, the representation in FIG. 10 refers to grasping means over just one of the longitudinal sides of the carriers, but it must be clear that the driving pulley 33 can extend crosswise with respect to the drawing, in such a way as to shape a second face including a plurality of grasping plates provided for performing the same function as the plates of the first face.

The plant 1 comprises a second pulley 40 mounted idle an the fixed structure along the third connection are between the first and the second stretch.

The pulley 40 is joined to the fixed structure with a rotation axis parallel to the one of the first pulley.

Similarly to that already described for the first pulley, the second pulley too includes on its peripheral parts a plurality of grasping means 40' of carriers 9 moving from the first stretch.

Said grasping means 40' include a plurality of plates 41 staggered 90° among them, each plate being provided with a pair of cavities 42,42' planned to block portions of the shafts of the wheels belonging to adjacent carriers.

Unlike that shown about the first pulley, the second pulley is dragged to rotation by the carriers moving from the first to the second stretch.

The carriers along the pulleys 33,40 have the configuration of cords of an arc of a circle. In the second stretch the plant realizes the motion of carriers separated from one another by means of a second operating system independent of the first operating system.

The second operating system includes transferring means of the carriers along the second stretch using at least a supporting surface moved by its own moving mechanisms starting at some distance from the exit of the second pulley 40 towards the entry of the first pulley 33. Said supporting surface starts from the section "T" (FIG. 11) where the carriers are separated from each other for the interference between the lever 24 and the slope 32.

In a particular embodiment the supporting surface can be made by a conveyor belt.

Figure 11:
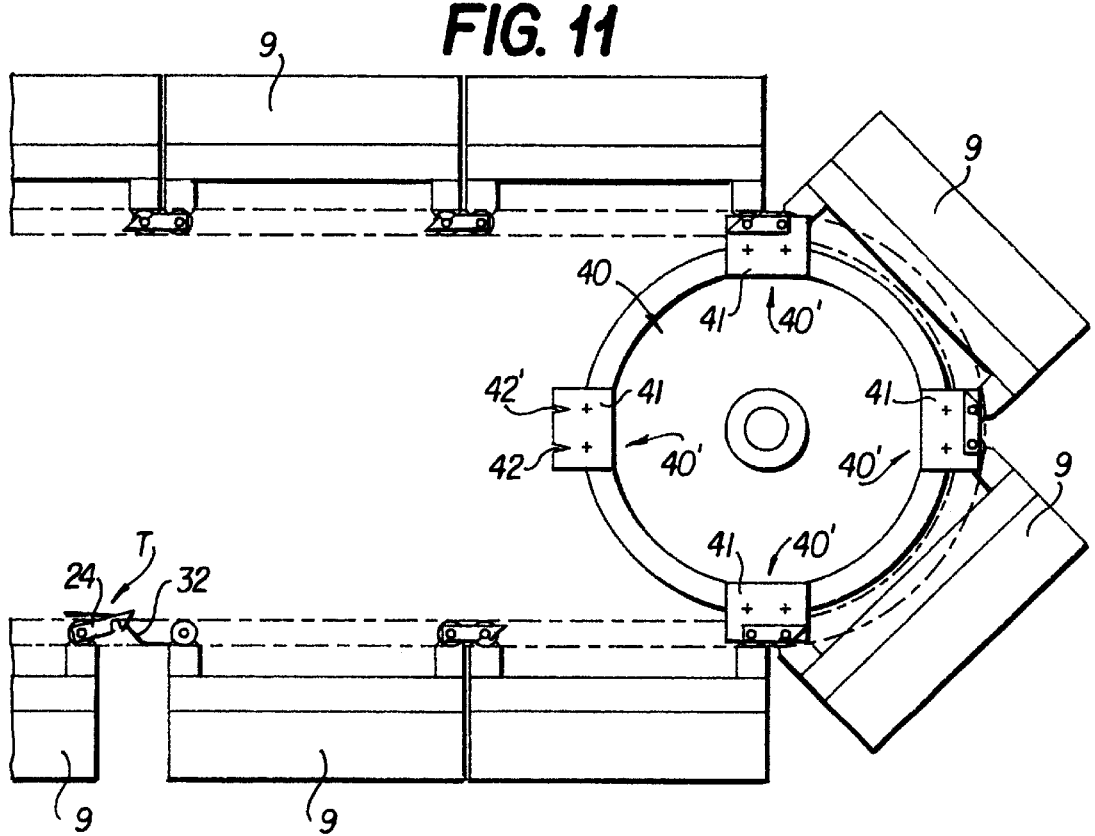
FIG. 11 is an enlargement of a partial longitudinal view of FIG. 1 close to a second pulley.

In practice, carriers should come to the section "T" shown in FIG. 11 in the same way as, for example, a single person could come by its own means on a moving conveyor belt and then be dragged by the latter at the linear speed given by the moving mechanisms of the belt.

Preferentially said transferring means are a pair of chains moved by respective driving means. The two chains are placed side by side at a distance roughly alike the width of the carriers.

Each chain has a ring-like configuration and meshes at its ends with two gearwheels respectively driving and driven.

In FIG. 8 one of such chains 43 is partially shown, meshing by means of one of its pins 44 with one of the teeth 45 of a gearwheel 46.

An engine 47 whose casing is fastened to the fixed structure, moves the gearwheel 46. Such a solution provides in each carrier a pair of lateral flanges parallel to the laying plane 12. In FIG. 8 one of the two lateral flanges resting on the links of the chain 44, is shown as number 48.

In an advantageous solution the lateral flanges can be provided with a coating of high friction material 49 aimed to avoid possible slipping between chains and carriers.

Similarly to what is mentioned about the embodiment using a conveyor belt, carriers resting with their weight on the chains are moved at the speed given to the chains by the engine 47 (FIG.8 ).

Preferentially the second operating system comprises, along the second stretch, first and second transferring means 50, 51 (FIG. 1) working in sequence by their driving means 47,51', intermediate transferring means 52, moved by their own means 52', operate in a space interposed in between.

All of the three transferring means 50, 51,52 are moved at the same speed.

The intermediate transferring means 52 is placed on transverse shifting means 53 provided for moving in transverse direction the carriers arrived to such an intermediate means.

Advantageously using said intermediate transferring means 52 and said transverse shifting means 53, it is possible to remove one or more carriers of the plant for changing their size, or for maintenance operations, putting them again along the second stretch, with no interruption of the manufacturing cycle.

The transferring means 50, 51, 52 are power transmitting elements and preferentially, as shown in FIG.8, they are pairs of lateral chains whereon carriers rest by their lateral flanges 48. Moreover the transverse shifting means 53 comprises preferentially, as schematized in FIG. 1, a framework 54 provided with wheels 55, movable by suitable pushing means.

To this purpose, possible pushing means can be fluodynamic controls or electrical or mechanical driving means.

The described plant can be on the whole of size comparable or even larger to that or plants used with known manufacturing techniques for products with recesses.

In an embodiment the length between the two pulleys is, 40 can be between 20 and 35 meters, for instance 28 meters, with carriers arranged as in FIG. 1 and the addition of a further carrier resting on transferring means 50.

Carriers can be more than 40 cm long, in some embodiments between 50 and 100 cm. In the embodiment where pulley axes are 28 meters apart, each carrier is 90 cm long and earners are on the whole 42, carriers resting on the first stretch are 31.

Products with recesses manufactured according to the present solution can be more than 20 cm thick; for instance these products can be mattresses 2 (FIG. 2) between 14 and 18 cm thick, with 11 mm deep recesses 7 in the first case.

Manufacturing of products of latex foam material with recesses of unlimited length, for instance a mattress, occurs as follows At the first station (FIG. 1) the device 4 injects latex foam material over carriers arriving in sequence to such a station.

Latex foam material, already emulsified with air, is sent to device 4 by a pump connected to a tank (not shown) in which a water suspension of natural or synthetic latex, for instance butadyene-styrol, mixed with tensioactive charges, has been prepared.

Before arriving at the vulcanize, carriers move under suitable heating means, necessary to foam gelation phase, aimed at avoiding collapse processes.

Afterwards carriers cross the vulcanizer device 8 and hence arrive at the second station 5 where the pair of rolls 6 cause the removing of the continuous, already vulcanized, latex layer which will give, for successive cuts, a plurality of mattresses.

Between stations 3 and 5 the adjacent carriers are joined with each other by the respective levers 24 (FIG. 10) and are moved by the mechanical push taken by carriers dragged into rotation by the driving pulley 33.

At the exit of the second station 5, carriers 9 (FIG. 11) are forced to run along the third connecting arc 16 between the first and the second rectilinear stretch 10, 11 of the plant; along the third connecting arc is imposed the mechanical block between the shafts of the carriers and the grasping means 40' placed on the pulley 40.

Practically, the pulley 40 is dragged into rotation by the carriers in their turn associated to the fixed structure by means of the respective wheels 19, obliged to run along the C-shaped outlines of the fixed structure.

At the exit of the second pulley and before beginning the return way of the carriers to the first station, release between adjacent carriers occurs.

The release phase enables a motion and a return speed of the carriers in the second stretch independent of and higher than, the one of the first stretch.

Substantially, carriers meet the cam surface 32 and are released from one another by the anticlockwise rotation of the lever 24, coming therefore singly to the transferring means of the second rectilinear stretch.

Carriers rest by their lateral flanges 48 (FIG. 8) on the links in the chains 44 and are moved at the same speed at the chains, that is at a linear speed much higher than the one provided for the carriers pushed from the first to the second station.

In a preferred embodiment it is planned that the speed of the carriers in the first stretch is 1 mt/min and the one of the carriers dragged by the chains 30 mt/min.

The transferring means of the second stretch, lead in sequence the carriers to an area close to the entry of the driving pulley; in such an area joining of adjacent carriers occurs by a mechanism like that of FIG. 9 and therefore not shown and described in particular. However, the joining system includes a slope on the fixed surface of the structure tilted in the opposite direction with respect to the one in FIG. 9 or, a device able to make the lever 24 of a carrier turn clockwise for linking to an adjacent carrier.

Carriers are then taken by the pulley 33 (FIG. 10) remaining dragged into rotation by the grasping means 34 standing on the peripheral part of the same pulley.

In the preferred embodiment of description it is worth noting that the transferring means in the second part are three, respectively 50, 51, 52, the last one forming the intermediate transferring means.

If the manufacturing process envisages the possible replacement of one or more carriers for size charges the transverse shifting means 53 are brought into operation so that all the framework 54 with the carrier to be modified is shifted to a side of the plant, close to a station where the camera is adjusted according to new manufacturing necessities of the product with recesses. The carrier is again inserted into the manufacturing cycle by means of the same framework 54.

In a particular realization the plant can include a second framework similar to framework 53 and also provided with similar transferring and transverse shifting means. Such a framework (not shown) can be placed at the opposite side of the plant with respect to the cross position reached by the first framework or even in an other position.

The second framework enables one to prearrange upon it the carriers with the wanted changes, waiting for the removing of framework 53 bearing the no longer suitable carriers. The second framework can be inserted into the second stretch of the plant simultaneously with the removing of the first framework.

However, whatever the solution used, the invention provides that the total number of carriers standing at the entry of the driving pulley before being dragged into rotation, those going out from the driven wheel before being taken by the transferring means, those placed on the transferring means between the two pulleys, as well as the linear speed of such transferring means in the second stretch, are adjusted in such a way that, even changing a carrier with a modified one, a complete filling up with carriers of the first stretch 10 can be obtained.

Practically the number of carriers waiting to be dragged into rotation by the driving pulley is chosen in order not to interrupt the manufacturing cycle, regardless of the kind of maintenance used, and to maintain at any moment the complete filling up of the first stretch of the plant with carriers touching each other in sequence The invention enables a number of advantages compared with known processes.

It must be stressed the lower number of laying planes of the latex foam material according to the invention, compared to the known laying planes performed as plates hinged at their ends on the moving chains.

Looking at the ring-like configuration of the plant in FIG. 1 comprising laying planes of defined extension and comparing it to the known plant made up by equally sized plates, it is noticed that, according to the known technique the number of planes is the same in the two rectilinear stretches respectively upper and lower between the first and the second station, whereas the total number of laying planes in the realization according to the invention is much lower, owing to the very few planes always present in the second to stretch.

Consequently any form of actuation according to the invention, not only involves a lower planning cost compared to the known technique, but enables moreover considerable saving of time and labor in any phase of maintenance and/or adjustment to a new manufacturing cycle for a different product with recesses.

Such an advantage occurs even if works for maintenance and adjustment to a new manufacturing cycle are carried on when the plant is idle.

In fact, the lower number of laying planes according to the invention involves a lower length of time of observation of the different structures associated with such planes, as well as a cutback of possible intervention time for changing one or more sizes in each laying plane, for instance a significant reduction of the time required to change shape and/or height of the protuberances in each carrier.

It is even clearer that the embodiments according to the invention enable one to intervene for repairing or replacing one or more carriers without stopping the manufacturing cycle.

Such an advantage is not completely possible using the known technique, since the laying plates are hinged to the sides of moving chains, so that any replacement of a damaged plate, would necessarily involve the stopping of the whole plant, for separating the plate from the chain and then hinge a new plate to the chains.

It is also worth noting that in the embodiments according to the invention, it is possible to replace a plurality or even all the laying planes without stopping the manufacturing cycle. This favorable condition depends on the fact that the present solution separates the motion of foam-filled laying planes of the first stretch from that of the foam free ones of the second stretch. The embodiment according to the invention using the transferring means 50, 51, 52 and the transversal shifting means 53, enables this operation.

The invention presents further advantages deriving from the realization of the laying planes not mechanically connected to the advancing means of the same laying planes. It must be remembered, in fact, that the laying planes are formed by carriers moved in the first stretch 10 by mechanical pushes carried from a carrier to the adjacent one and by the motion of chains on which carriers rest in the second stretch 11.

Therefore, the different embodiments made according, to the invention are devoid of mechanical linkings, such as hinges, pins and the like present, for instance in the state of art between the various plates and the moving chains of the plates.

Practically in the present solution, the possible thermal expansions of carriers and chains cannot be mutually transmitted, no permanent linkings being present between the ones and the others; so that all risks of mechanical stresses that in the known technique could originate clearance between adjacent planes causing pronounced borderlines in the final product, are reduced if not nullified.

In the state of art the possible discontinuities or irregularities due to mechanical stresses could be avoided replacing worn laying surfaces with new ones this however involved the stopping of the plant.

The present solution, overcoming, as cited, such problems, enables to have improvements compared to the known technique, not only with regard to the plant, but also to the final product.

Though some forms of actuation of the present invention have been shown and described, all possible changes accessible to a technician of this field are meant to be included; for instance the plant described for the continuous manufacturing of latex foam products for mattresses, cushions and the like could be exploited also for manufacturing the same products using non latex foam materials, such as polyurethane and similar materials, suitable to produce elastically deformable products.

What is claimed is:

1. A plant (1) for continuously manufacturing foam products of unlimited length envisaged to form mattresses (2), and cushions comprising a foam material injecting device (4), placed in a first station (3), means for the laying of the foam material, each provided with a laying plane (12) of predetermined size, a vulcanizer (8), operating means of said laying means, removing means of the vulcanized product of unlimited length placed in a second station (5), a ring-like path where a plurality of laying planes are capable of moving along a fixed structure delimited by a first and a second stretch (10,11) joined at their ends by a third and a fourth stretch (16,17) shaped as an arc of a circle being respectively the third stretch (16) between the exit of the first stretch (10) and the entry of the second stretch (11) and the fourth stretch (17) between the exit of the second stretch (11) and the entry of the first stretch (10), in said first stretch (10) being provided the moving of the laying planes at a first speed from the first (3) to the second station (5) and in said second stretch (11) the taking back of the laying planes (12) downstream of the second station (5) towards the first station (3), wherein:

a) the first stretch (10) is covered for its whole extension by a plurality of laying planes (12) placed side by side to each other and forming a continuous surface filled with foam material and the second stretch (11) is only partially covered by laying planes through its whole extension, said laying planes of the second stretch being devoid of foam material and the number of laying planes in the second stretch being lower than the ones of said plurality of the first stretch, b) said operating means comprises a first and a second operating system, different and independent of each other, the first operating system (33,34) giving a mechanical push to the plurality of laying planes (12) of the first stretch (10) in contact with each other from the first to the second station, c) the second operating system (50,51) transfers at a second speed higher than the first speed along the second stretch (11) the laying planes devoid of foam material toward the first station (3), d) the laying planes from the first station up to the exit of the third stretch are adjacent and mechanically linked in series, e) said laying planes after the exit of the third stretch and before the second stretch are mechanically disconnected from each other, the ratio between the speed of the second and the first stretch determining the presence of a laying plane at the first station (3) in correspondence of the exit of a laying plane at the second station (5).

2. The plant as in claim 1 comprising replacing and changing means of the laying planes moved along the second stretch, without stopping the manufacturing cycle.

3. The plant as in claim 1, wherein the second stretch is subdivided into two sections, first and second, separated from each other by an area of predetermined size, the sections being provided respectively with a first and a second means for transferring (50,51) the foam devoid laying planes.

4. The plant as in claim 3, further comprising a third operating system (52,53) along said area of predetermined size, for moving said laying planes onto a changing station and then taking back said laying planes to the manufacturing cycle.

5. The plant as in claim 1 wherein said laying means are formed by carriers (9) with their bottom surfaces (12) corresponding to said laying planes, said carriers being provided with sets of wheels (19) and guide means (21) for the sets of wheels.

6. The plant as in claim 1, wherein said laying planes are carriers (9) moved along said fixed structure delimited by said first and said second stretch (10, 11) joined at their ends by a third and a fourth stretch (16,17).

7. The plant as in claim 5 wherein said guide means comprise along the fixed structure on the sides of the carriers (9), C-shaped outlines (21) inside which said sets of wheels (19) run.

8. The plant as in claim 5 comprising temporary linking means (22,23) between adjacent carriers.

9. The plant as in claim 5 comprising a lever (24), hinged on one side to one end (25) of the carrier (9) and cam means (32) on the fixed structure, the free end (26) of said lever (24) interfering with said cam means for rotating according to opposite directions or blocking or separating adjacent carriers from each other.

10. The plant as in claim 5 wherein each carrier comprises: a lever (24) hinged on the axis of one of the set of wheels (19), and a groove (27) placed on the lever between the hinge (25) and the free end (26), said lever being rotated by cam means (32) located on the fixed structure for inserting said groove into parts of an adjacent carrier.

11. The plant as in claim 6 comprising a first driving pulley (33) with its periphery placed along said fourth connecting arc (17), said driving pulley being provided along its periphery with cavities (38,39), staggered among them by equal angles, said cavities being engaged in sequence with the shafts of the wheels (19) of the carriers (9) arriving at the entry of the fourth connecting arc (17), the rotation of the driving pulley (33) applying a mechanical dragging torque to the carriers (9) engaged in said cavities (38,39), the carriers going out of the driving pulley (33) giving a mechanical push to all of the carriers placed in the first stretch (10).

12. The plant as in claim 6 comprising an idle pulley (40) with its periphery located along said third connecting arc (16), said idle pulley being provided along its periphery with cavities (42,42') staggered from each other by equal angles, said cavities being engaged in sequence by the shafts of the wheels (19) of the carriers entering the third connecting arc (16), the moving push of the carrier going out of the idle pulley being balanced by an opposite push determined by the connection with the upstream carriers.

13. The plant as in claim 6 wherein said carriers are moved along the second stretch (11) by an operating system comprising transferring means (50,51) and driving means, each of said carriers (9) comprising on their sides a pair of flanges (48) parallel to the bottom surface (12), said flanges standing on said transferring means (50,51).

14. The plant as in claim 13 wherein said transferring means and said driving means comprise a pair of power transmitting elements, said transmitting elements being ring wound around a driving and a driven wheel, the flanges (49) of each carrier standing on said pair of power transmitting elements, after the interposition of some material (49) having high friction coefficient.

15. The plant as in claim 13 wherein that said transferring means are chains (43).

16. The plant as in claim 1, envisaged to manufacture products of latex foam material provided with recesses, wherein each laying plane (12) further comprises a plurality of protuberances (13) of predetermined size corresponding to the shape of said recesses (7).

17. The plant as in claim 1, wherein said second operating system comprises, along the second stretch (11), first and second means for transferring (50,51), intermediate means for transferring (52) interposed between the first and second means for transferring (50,51), driving means, transverse shifting means (53), said intermediate means for transferring being placed on said transverse shifting means, said laying planes devoid of foam material resting in sequence on said first, intermediate and second means for transferring (50, 52, 51) all moved at the same speed, said transverse shifting means (53) moving in transverse direction the laying plane resting on the intermediate means for transferring (52) for changing its sizes and putting then the modified laying plane (12) again along the second stretch (11) with no interruption of the manufacturing cycle.

18. The plant as in claim 1, wherein said second operating system further comprises at least a supporting surface where said laying planes devoid of foam material stand with their weight, said supporting surface being moved by its own moving mechanism along said second stretch.

* * * * *